United States Patent [19]
Holmes

[11] Patent Number: 6,138,952
[45] Date of Patent: Oct. 31, 2000

[54] TRANSIENT FREE ACTUATOR SWITCHING

[75] Inventor: Thomas J. Holmes, Portola Valley, Calif.

[73] Assignee: Space Systems/Loral, Inc., Palo Alto, Calif.

[21] Appl. No.: 09/330,404

[22] Filed: Jun. 11, 1999

[51] Int. Cl.$^7$ ........................................... B64G 1/24
[52] U.S. Cl. ........................... 244/164; 244/165; 701/13
[58] Field of Search .................................... 244/164–165; 701/13

[56] References Cited

U.S. PATENT DOCUMENTS

| | | | |
|---|---|---|---|
| 3,999,729 | 12/1976 | Muhlfelder et al. | 244/165 |
| 4,260,942 | 4/1981 | Fleming | 244/165 |
| 4,723,735 | 2/1988 | Eisenhaure et al. | 244/165 |
| 5,201,833 | 4/1993 | Goodzeit et al. | 244/165 |
| 5,791,598 | 8/1998 | Roddent et al. | 244/165 |

*Primary Examiner*—Galen L. Barefoot
*Attorney, Agent, or Firm*—Kenneth W. Float

[57] ABSTRACT

An automatic apparatus and method that is used to switch actuators, such as momentum wheels, used on a spacecraft without impacting the pointing performance of the spacecraft. The apparatus and method allows an actuator to be automatically deactivated without affecting spacecraft performance such as is caused by a failed actuator. A plurality of local actuator controllers are respectively coupled to a plurality of actuators. A system controller is coupled to the plurality of local controllers and implements a control algorithm corresponding to the present method that determines forces/torques for each of the actuators and outputs force/torque commands to each of the actuators to control the pointing direction of the spacecraft. This is achieved by estimating the drag exerted by or integral control signal produced by each actuator to determine if it is approaching failure. In the event of failure, a backup actuator is activated, the failing actuator is shut down, and the forces/torques exerted by the remaining actuators are adjusted in an amount corresponding to the force/torque exerted by the failing actuator.

7 Claims, 2 Drawing Sheets

TRANSIENT FREE ACTUATOR SWITCHING

BACKGROUND

The present invention relates generally to spacecraft control systems and methods, and more particularly, to automatic apparatus and method for switching actuators used on a spacecraft.

Pervious automatic actuator switching techniques have used a zero speed tachometer loop. Such loops are disclosed in U.S. Pat. No. 5,201,833 issued to Goodzeit et al. entitled "Attitude control system with reaction wheel friction compensation", and U.S. Pat. No. 5,020,745 issued to Stetson, Jr. entitled "Reaction wheel fricton compensation using dither", for example.

U.S. Pat. No. 5,201,833 discloses a spacecraft attitude control system that uses one or more momentum or reaction wheels. Wheel bearing viscous (velocity-dependent) friction reduces the actual torque imparted to the spacecraft in response to a torque command signal. Friction compensation is achieved by applying the torque command signal to a model of an ideal, friction-free wheel, and calculating the speed which the ideal wheel achieves in response to the torque command. An error signal is generated from the difference between the ideal wheel speed and the actual wheel speed. The error signal is summed with the torque command signal to produce the wheel drive signal. This results in a closed-loop feedback system in which the actual wheel speed tends toward the ideal wheel speed, thereby causing a torque on the spacecraft which is substantially equal to that commanded.

U.S. Pat. No. 5,020,745 discloses a reaction-wheel stabilized spacecraft wherein attitude errors at wheel reversals are reduced by application of a dither component to the wheel torque command signal. This invention is used on a reaction wheel stabilized spacecraft includes a body and at least one reaction wheel mounted for rotation about an axis of the body. A controllable torquer applies torque to the wheel in response to a torque command signal to accelerate or decelerate the reaction wheel and transfer momentum to the spacecraft body. Sensors are used to sense the spacecraft attitude and generate a signal in response to the deviation of the body from a desired rotational position about the axis. A controller includes an integrator coupled to the sensor for generating an attitude-sensitive component of the torque commend signal. A summer receives the attitude-sensitive component of the torque command signal and an alternating signal and generates the dithered torque command signal.

However, using such conventional zero speed tachometer loops, operator intervention is required. Furthermore, if an actuator degrades gradually, loss of lock may occur when using conventional zero speed tachometer loops.

It would therefore be advantageous to have an improved apparatus and method for automatically switching actuators used on a spacecraft when they experience gradual degradation. It would also be advantageous to have an automatic actuator switching apparatus and method that automatically switches actuators without impacting pointing performance of the spacecraft.

SUMMARY OF THE INVENTION

To provide the above advantages, the present invention provides for an automatic apparatus and method that is used to switch actuators, such as momentum wheels, used on a spacecraft without impacting the pointing performance of the spacecraft. The present apparatus and method allows an actuator to be deactivated automatically without affecting spacecraft performance such as is caused by a failed actuator (momentum wheel).

More particularly, the system comprises a plurality of actuators, a plurality of local actuator controllers respectively coupled to the plurality of actuators, and a system controller coupled to the plurality of local actuator controllers.

The system controller implements a control algorithm that determines forces/torques for each of the actuators or the integral control signal used by each of the actuators and outputs force/torque commands to each of the actuators to control the pointing direction of the spacecraft. The drag exerted by each actuator is estimated to determine if it is approaching failure. In the event of failure of an actuator, a backup actuator is activated and the failing actuator is shut down while the forces/torques exerted by the remaining actuators are augmented (adjusted) in an amount corresponding to the force/torque exerted by the failing actuator.

The method implements a actuator control algorithm and comprises the following steps. The drag and drag rate of a plurality of actuators are estimated. A determination is made if an actuator is failing.

If the actuator is not failing, it is determined if the drag exerted by the actuator exceeds a predetermined threshold. If the drag exerted by the actuator does not exceed the predetermined threshold, it is determined if the drag is below a threshold set for a failing actuator. If the drag exerted by the actuator does not exceed threshold set for a failing actuator, the force/torque of the actuator is set to a fraction of the drag estimate of the actuator. The forces/torques of the active actuators are corrected to account for the force/torque exerted by the failing actuator.

If the drag exerted by the actuator exceeds the predetermined threshold, it is determined if the failing actuator is useable. If the failing actuator is useable, the remaining actuators are set as active actuators and the failing but useable actuator is set as a failing actuator. The force/torque of the failing actuator is set to a fraction of the drag estimate thereof. The forces/torques of the active actuators are corrected to account for the force/torque exerted by the failing actuator. If the failing actuator is unusable, forces/torques for the active actuators are computed and applied.

If the drag exerted by the failing actuator exceeds the threshold set for a failing actuator, the failing actuator is set as unusable. Forces/torques for the active actuators are computed without regard to the failed actuator and applying the forces/torques to the active actuators.

User or operator intervention is not required when using the present apparatus and method. Furthermore, the spacecraft will not lose lock prior to wheel failure caused by gradual degradation.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
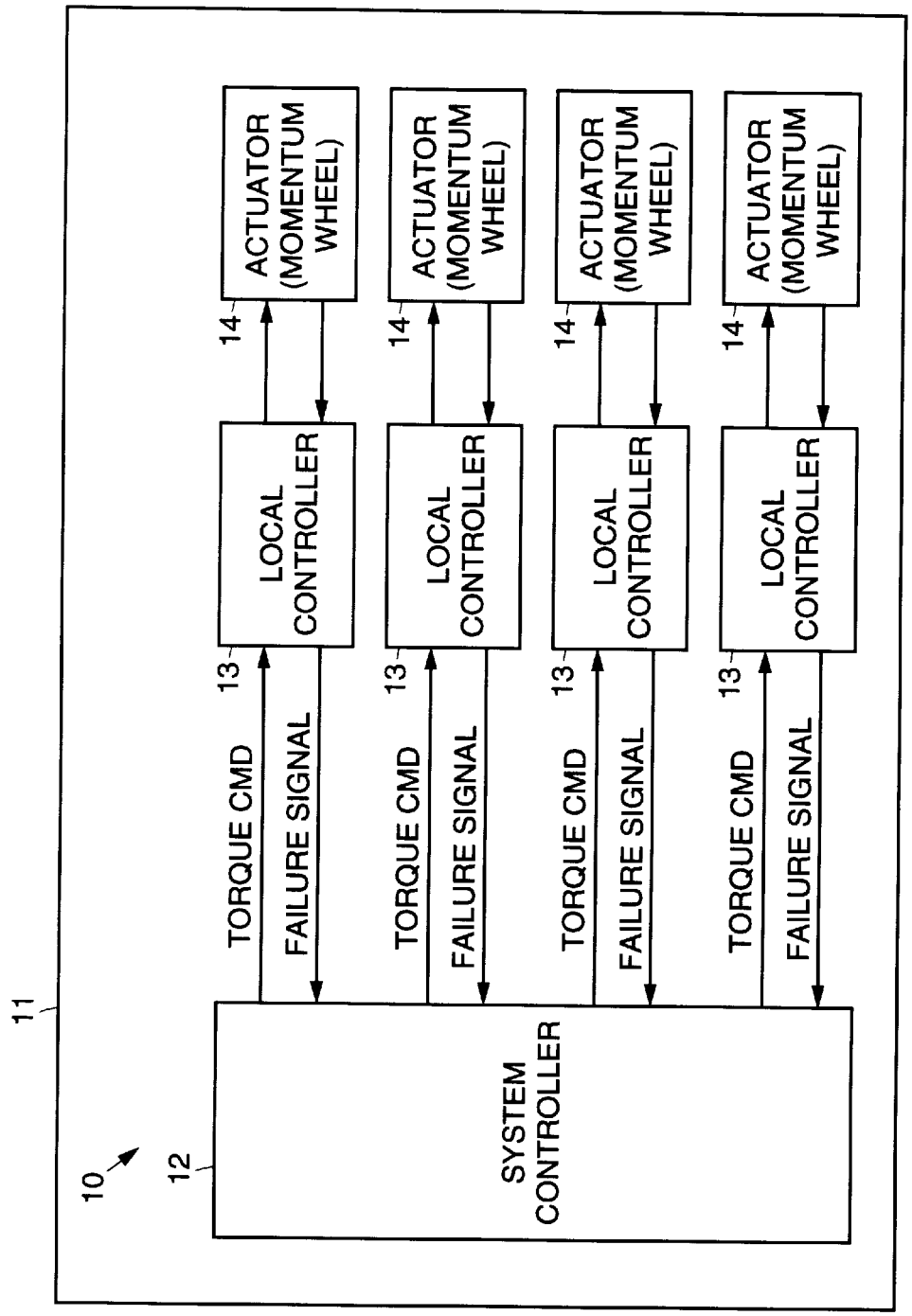
FIG. 1 illustrates an exemplary system that implements an automatic actuator switching method in accordance with the principles of the present invention.

Referring to the drawing figures, FIG. 1 illustrates an exemplary system 10 that implements an automatic actuator switching method 20 in accordance with the principles of the present invention. The system is employed on a spacecraft 11, or satellite 11. The system comprises a system (attitude) controller 12 that is coupled by way of a plurality of local actuator controllers 13 to a plurality of actuators 14, such as momentum wheels 14.

The system controller 12 determines torques for each of the actuators 14 and outputs torque commands to each of the actuators 14 to control the orientation or pointing direction of the spacecraft 11. The system controller 12 determines the torques for each of the respective actuators 14 using the automatic actuator switching method 20 in accordance with the present invention. The method 20 will be described in more detail with reference to FIG. 2.

Figure 2:
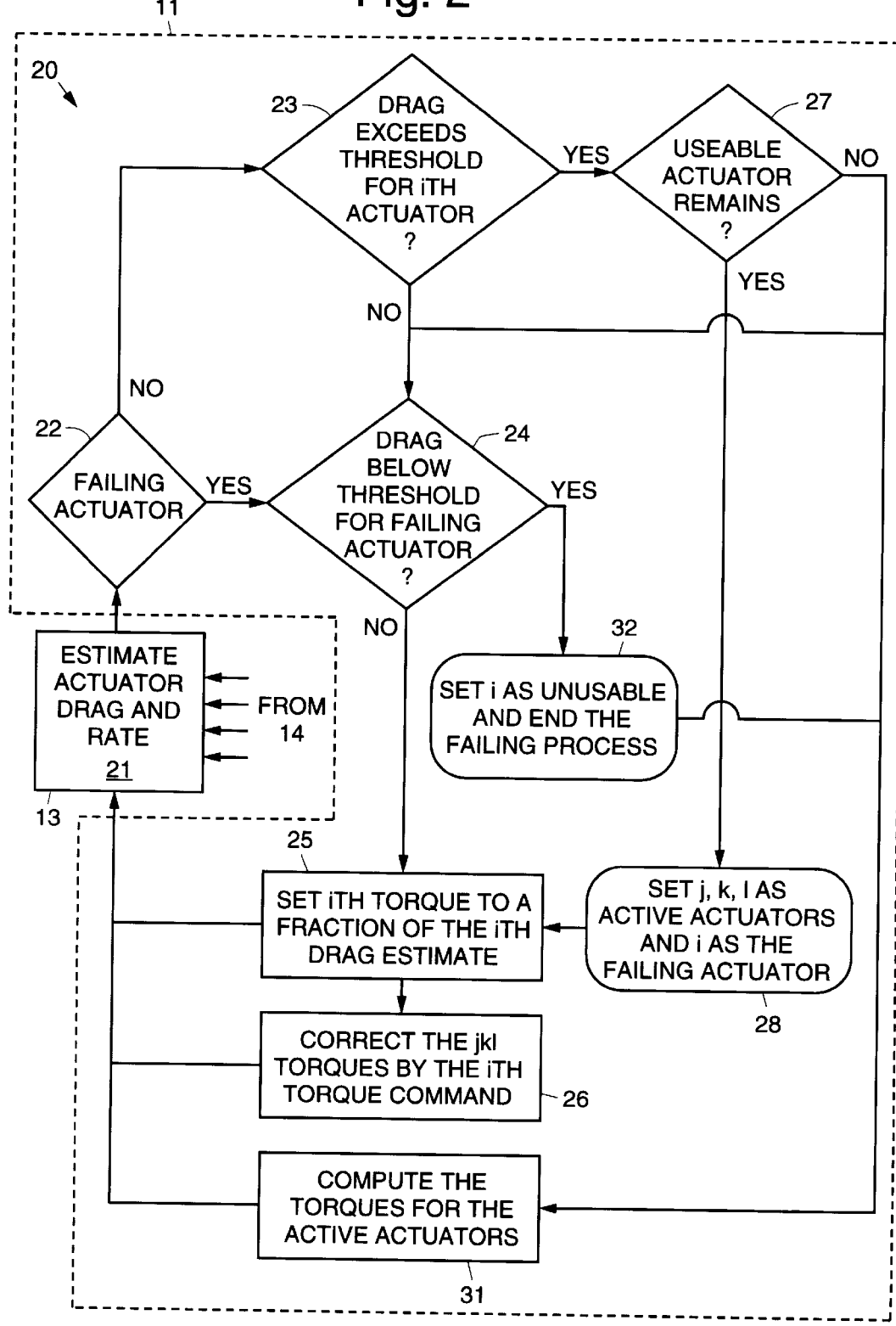
FIG. 2 illustrates the exemplary automatic actuator switching method in accordance with the principles of the present invention.

FIG. 2 illustrates the exemplary automatic actuator switching method 20 in accordance with the principles of the present invention. In particular, FIG. 2 shows high level decisions that implement the automatic actuator switching method 20.

The automatic actuator switching method 20 comprises an algorithm wherein the local actuator controller 13 estimates 21 the drag and drag rate of the actuator 14 coupled thereto. The local actuator controller 13 determines 22 if the actuator 14 coupled thereto is failing.

If the coupled actuator 14 is not failing, then the system controller 12 determines 23 if the drag exerted by the actuator 14 exceeds a predetermined threshold. If the system controller 12 determines 24 that the drag exerted by the actuator 14 does not exceed the predetermined threshold then the system controller 12 determines 24 if the drag is below a threshold set for a failing actuator 14.

If the system controller 12 determines 24 that the drag exerted by the actuator 14 does not exceed threshold set for a failing actuator 14, then the system controller 12 sets 25 the torque of the actuator 14 to a fraction of the drag estimate of the actuator 14 using the local actuator controller 13. In addition, the torques of the active actuators 13 are corrected 26 to account for the torque exerted by the failing actuator 14.

If the drag exerted by the actuator 14 exceeds the predetermined threshold, then a decision is made that determines 27 if the failing actuator 14 is useable. If the failing actuator 14 is determined 27 to be useable, then the remaining actuators 14 are set 28 as active actuators 14 and the failing but useable actuator 14 is set 28 as a failing actuator 14. The system controller 12 then sets 25 the torque of the failing actuator 14 to a fraction of the drag estimate of the failing actuator 14 using the local actuator controller 13. The torques of the active actuators 13 are also corrected 26 to account for the torque exerted by the failing actuator 14.

If the system controller 12 determines 27 that the failing actuator 14 is unusable, then the system controller 12 computes 31 torques for the active actuators 14. The computed torques are applied to the active actuators 14 by way of their local actuator controllers 13.

If the system controller 12 determines 24 that the drag exerted by the failing actuator 14 exceeds the threshold set for a failing actuator 14, then the failing actuator 14 is set 32 as unusable. The system controller 12 then computes 31 torques for the active actuators 14 without regard to the failed actuator 14. The computed torques are applied to the active actuators 14 by way of their local actuator controllers 13.

The automatic actuator switching method 20 prevents a loss of lock by automatically switching actuators 14 (momentum wheels 14) while maintaining nominal attitude pointing requirements of the spacecraft 11. Using estimates of the drag of each actuator 14 obtained through its local controller 13, a determination is made when an actuator 14 (momentum wheel 14) is approaching failure due to loss of lubricant, bearing or magnetic coil failure, for example.

When the predetermined limit is reached caused by any of these failure modes, the automatic actuator switching method 20 activate a backup actuator 14 (momentum wheel 14). The failing actuator 14 (momentum wheel 14) is then commanded to "stand down" by issuing it a torque request for a fraction (e.g., ½) of the estimate of the drag. All of the remaining actuators 14 (momentum wheels 14) are commanded as usual by way of the local actuator controllers 13, with an augmentation equal to the effect of the torque from the failing actuator 14.

The following equation illustrates "nominal" torque distribution using the present method 20, where $T_{sc \to jkl}$ is the torque distribution matrix from the respective axes of the spacecraft 11 to the j, k and l actuators 14 and $T_i$ is the torque for the ith object, either the spacecraft axis or the actuator 14. $T_{xyz}$ are the commanded torques from the system (attitude) controller 11.

$$\begin{bmatrix} T_j \\ T_k \\ T_l \end{bmatrix} = T_{sc \to jkl} * \begin{bmatrix} T_x \\ T_y \\ T_z \end{bmatrix}$$

The following equations illustrate the correction to requested spacecraft torques where $T_{i \to sc}$ is the torque influence matrix from the ith actuator 14 to the axes of the spacecraft 11.

$$T_i = \alpha * Drag_i.$$

$$\begin{bmatrix} \Delta T_x \\ \Delta T_y \\ \Delta T_z \end{bmatrix} = T_{i \to sc} * T_i$$

The following equation illustrates details for the corrected torques to the active actuators 14 while the failing actuator 14 is being brought off-line.

$$\begin{bmatrix} T_i \\ T_j \\ T_k \end{bmatrix} = T_{sc \to jkl} * \begin{bmatrix} T_x - \Delta T_x \\ T_y - \Delta T_y \\ T_z - \Delta T_z \end{bmatrix}$$

Thus, an improved apparatus and method for automatically switching actuators used on a spacecraft when they experience gradual degradation without impacting pointing performance of the spacecraft has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A system for use with a spacecraft that provides for automatic actuator switching, comprising:

a plurality of actuators;

a plurality of local actuator controllers respectively coupled to the plurality of actuators;

a system controller coupled to the plurality of local actuator controllers that implements a control algorithm that determines forces/torques for each of the actuators and outputs force/torque commands to each of the actuators to control the pointing direction of the spacecraft by estimating the drag exerted by each actuator to determine if it is approaching failure, and in the event of failure of an actuator, activating a backup actuator and shutting down the failing actuator and augmenting the force/torque exerted by the remaining actuators in an amount corresponding to the force/torque exerted by the failing actuator.

2. The system recited in claim 1 wherein the plurality of actuators comprise momentum wheels.

3. The system recited in claim 1 wherein the failing actuator is shut down by issuing a force/torque request for a fraction of the estimate of the drag exerted by the failing actuator.

4. The system recited in claim 3 wherein the fraction of the estimate of drag exerted by the failing actuator is ½.

5. An automatic actuator switching method comprising the steps of:

estimating the drag of a plurality of actuators;

determining if an actuator is failing;

determining if the drag exerted by the actuator exceeds a predetermined threshold if the actuator is not failing;

determining if the drag is below a threshold set for a failing actuator if the drag exerted by the actuator does not exceed the predetermined threshold;

setting the force/torque of the actuator to a fraction of the drag estimate of the actuator if the drag exerted by the actuator does not exceed threshold set for a failing actuator;

correcting the forces/torques of the active actuators to account for the force/torque exerted by the failing actuator;

determining if the failing actuator is useable if the drag exerted by the actuator exceeds the predetermined threshold;

if the failing actuator is useable, setting the remaining actuators as active actuators and setting the failing but useable actuator as a failing actuator;

setting the force/torque of the failing actuator to a fraction of the drag estimate thereof;

correcting the forces/torques of the active actuators to account for the force/torque exerted by the failing actuator;

if the failing actuator is unusable, computing and applying forces/torques for the active actuators;

if the drag exerted by the failing actuator exceeds the threshold set for a failing actuator, setting the failing actuator as unusable; and computing forces/torques for the active actuators without regard to the failed actuator and applying the forces/torques to the active actuators.

6. The method recited in claim 5 wherein the failing actuator is shut down by issuing a force/torque request for a fraction of the estimate of the drag exerted by the failing actuator.

7. The method recited in claim 6 wherein the fraction of the estimate of drag exerted by the failing actuator is ½.

* * * * *